A. SCHULZE.
PROCESS AND DEVICE FOR ASCERTAINING THE CORRECT EXPOSURE FOR COPYING ROWS OF PICTURES ON FILM BANDS.
APPLICATION FILED JAN. 20, 1920.
1,387,318. Patented Aug. 9, 1921.
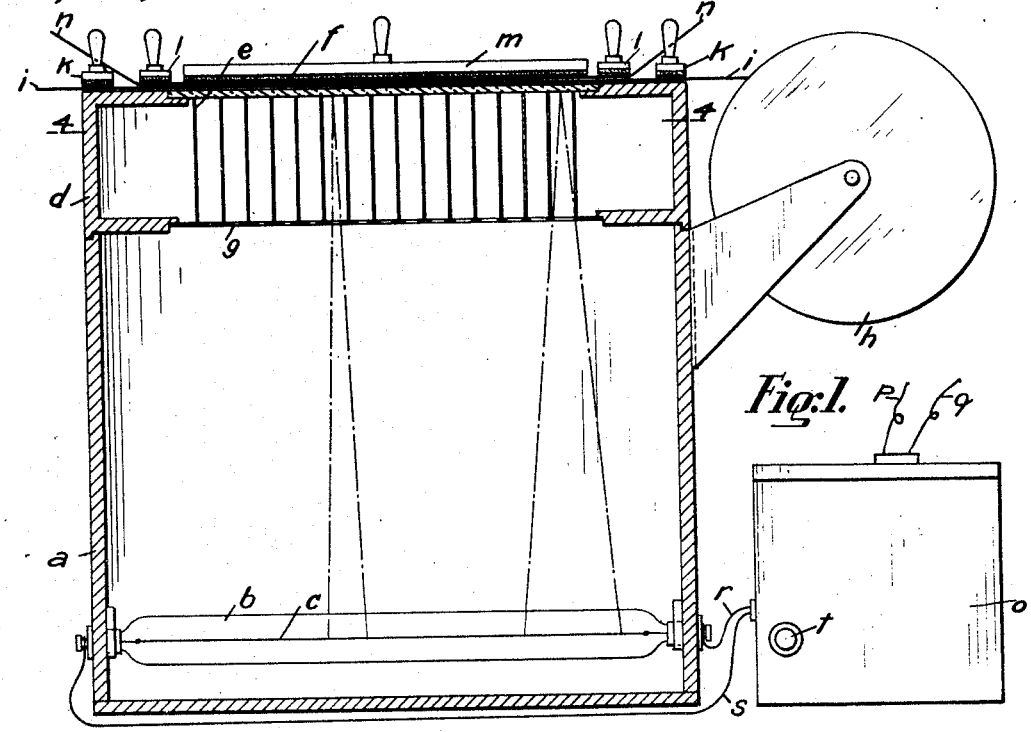
Fig:1.
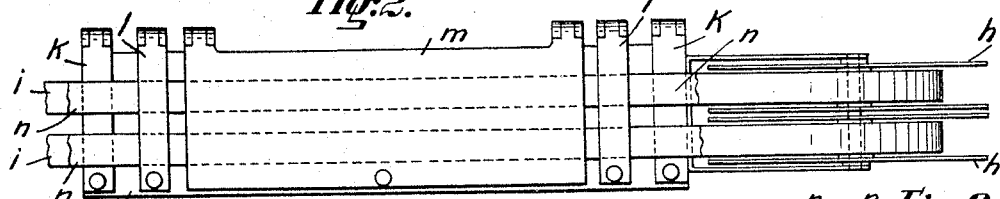
Fig:2.
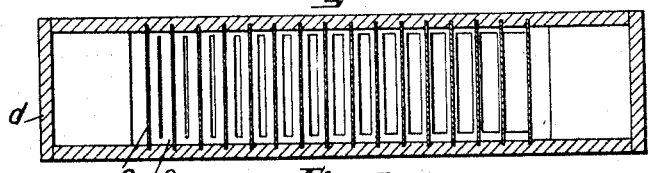
Fig:4.
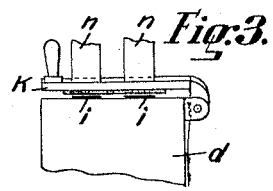
Fig:3.
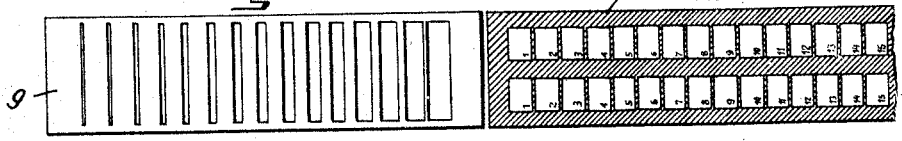
Fig:5. Fig:6.
Inventor
Arthur Schulze,
By [signature] Atty.

UNITED STATES PATENT OFFICE.

ARTHUR SCHULZE, OF BERLIN, GERMANY, ASSIGNOR OF ONE-HALF TO DEUTSCHE LICHTBILD-GESELLSCHAFT E. V., OF BERLIN, GERMANY.

PROCESS AND DEVICE FOR ASCERTAINING THE CORRECT EXPOSURE FOR COPYING ROWS OF PICTURES ON FILM-BANDS.

1,387,318.  Specification of Letters Patent.  Patented Aug. 9, 1921.

Application filed January 20, 1920. Serial No. 352,848.

*To all whom it may concern:*

Be it known that I, ARTHUR SCHULZE, a citizen of Germany, residing at Berlin, Germany, have invented certain new and useful Improvements in Processes and Devices for Ascertaining the Correct Exposure for Copying Rows of Pictures on Film-Bands, for which I have filed applications in Germany on October 14, 1918, under Sch. 53920 VI/57b, and on August 9, 1919, under D36,258 VI/57b, and of which the following is a specification.

This invention relates to a process and apparatus for making trial photographic pictures for ascertaining the correct time of exposure for the copying of rows of pictures on film bands in copying apparatus.

In these copying apparatus the positive and negative films, while in contact, are caused to move continuously, or step by step, past an exposure aperture, and the volume of light required varies in accordance with the density of the negative film. A very thin negative necessitates a small volume of light, while a negative which is heavy for high lights, and is foggy in its shadow portions has to be copied with a large volume of light.

It is well known in the art to vary the volume of light thrown onto a film by changing the velocity of the movement of the contacting films in the copying apparatus, and also to change the intensity of a glow-lamp or the like, used in the apparatus.

The question which volume of light should be chosen for the particular negative, must be decided as accurately as possible by a person skilled in judging negatives. The accuracy of the expert's estimate is generally checked by a subsequent test, which generally consists in copying about a foot of film with the estimated volume of light, whereby about fifteen individual pictures, all of which are subjected to equal volumes of light, are produced on the film band.

The object of the present invention is to provide a process and apparatus by the aid of which a number, say fifteen, individual pictures are produced not by equal volumes of light, but by fifteen different volumes corresponding to the number of different volumes of light for which the copying apparatus is constructed.

From such a trial length of film it may at once be seen which of the exposures or volumes of light must be chosen to obtain a good positive.

In carrying out the process according to the present invention an apparatus similar to a photometer is used, adapted to the special requirements of the case.

While photometers of the ordinary type are used for testing the sensitiveness of layers for observing the progress of a copying process such as the pigment printing process that cannot be checked by any other means, the photometer adapted for the purpose under consideration is to be used for actual printing, and even for printing a whole series of successive individual pictures, each of which is subjected to a different volume of light.

A constructional form of the invention is shown in the drawings, in which—

Figure 1 is a sectional elevation of a device used for carrying out the process according to my invention, and Fig. 2 is a corresponding plan view.

Fig. 3 is a side elevation of the upper part of the apparatus.

Fig. 4 is a plan section on the line 4—4 of Fig. 1.

Fig. 5 is a view of the diaphragm, and

Fig. 6 is a view of the glass plate on which the film strips are laid and which bear the numbers to be printed on the individual pictures.

At the bottom of a rectangular box $a$ is an electric glow-lamp $b$ with a long incandescent metallic filament $c$. A long rectangular box $d$ is arranged to be placed upon the box $a$. By means of sixteen metal strips $e$ fitting into corresponding grooves in the sides of the box $d$ fifteen parallelepipedal cells are formed, which are closed at the top by a glass plate $f$ (see Figs 1 and 6) and partially closed at the bottom by a diaphragm $g$ (see Figs. 1, 4 and 5). The diaphragm has slots corresponding in number to the number of cells, the relative widths of these slots being as $$1 : \frac{3}{\sqrt[2]{2}} : \frac{3}{\sqrt[4]{2}} : 2 : 2\frac{3}{\sqrt[2]{2}}.$$

The glass plate $f$ is blackened or has dark paper glued to it; but above each tubular cell two rectangular areas are left transparent so that altogether two rows, each having fifteen transparent areas, are formed. The fifteen transparent areas of each row are numbered consecutively from 1 to 15. The distance between every two adjacent metal strips $e$ is equal to the height of each individual picture of a film. The width of the box $d$ is such that two film bands can be copied beside each other simultaneously.

At the left and right hand ends of the top of the box $d$ there are two narrow hinged flaps $k$ and beside them two other narrow flaps $l$. Between the flaps $l$ a broad flap $m$ is arranged. The bottom surfaces of all the flaps $k$, $l$, $m$, may be covered with velvet or the like, and are pressed by their weight (or by springs) against the upper surface of the box $d$, but they may also be kept raised.

Each transparent area in the glass plate is as wide and as high as an individual picture. Journaled at the side of the box $a$ are two film reels $h$ (see Figs. 1 and 2) upon which the negatives to be copied are wound. The flaps $k$, $l$ and $m$ are now all raised and the two film strips $i$ to be copied are wound off the reels $h$ and placed beside each other on the box $d$ or on the glass plate $f$ in such a manner that the individual pictures to be copied lie above the unobstructing areas in the glass plate $f$. The two flaps $k$ are thereupon turned down so as to hold the two film bands $i$ in position. Two positive films $n$, corresponding in length to the negatives, so as to register with them, are secured in position by turning down the flaps $l$. Finally the large flap $m$ is also turned down. Arranged beside the box $a$ is an electric time switch $o$ of any of the known types employed for lighting stairs for a certain interval of time; switching off the light automatically when this interval has expired. The electric current traverses the wires $p$ and $q$, the time switch O, the wires $r$ and $s$ and the glow-lamp $b$. By pressing the button $t$, the glow-lamp $b$ is switched into circuit, and when the time for which the time switch is adjusted, say three minutes, has expired, the current is automatically switched off.

Thus in each film strip fifteen pictures situated one beside the other are exposed for the same period of time (say 3 minutes) but to different intensities of light. The brightness of the light thrown onto each individual picture depends upon the width of the slot in the diaphragm $g$ opposite to the film because, as indicated by the broken lines in Fig. 1, each point of the particular picture in question receives light from a portion of the filament of the glow-lamp whose length is proportional to the breadth of the corresponding slot in the diaphragm. In copying the negative the numbers 1 to 15 printed on the glass plate are also reproduced on the positive. With these fifteen trial pictures it is very easy to determine the manner in which the copying apparatus used for the exposure of the positive film must be regulated.

In a copying apparatus the volume of light thrown onto the film is a product of the intensity of the light used and the time of exposure. Both of these factors are variable. The brilliancy of the glowlamp may be reduced by a rheostat. The time of exposure depends on the speed of operation of the mechanism that moves the films. By a suitable variable resistance or rheostat the speed of travel of the mechanism may be slowed down so as to increase the time of exposure of the film.

As a rule, there are eight different values of brilliancy or light intensity of the lamp, and eight values of the speed of travel of the mechanism, and from the usual combination of these values fifteen different light volumes are caused to affect the positive film. There is no difficulty for any person skilled in the art to proportion the light volumes of the fifteen steps of the copying apparatus so as to agree with or have a proper relation to the light volumes used in the photometer, and vice versa so that, for instance, the trial picture 5 corresponds to the light and velocity combination 5 of the copying apparatus.

My invention overcomes many other difficulties in printing positive films. By producing an additional trial row of pictures it is possible to determine what volume of light will produce the best result if another developer or a different time of development is employed.

An answer can also be found to another question which is not always easy to solve. That is: whether in the case of a weak negative a better result is obtainable by interposing a yellow plate than without a yellow plate?

To facilitate the production of such supplementary trial rows, it is advisable to combine two or three of the afore-described contrivances, which must be perfectly similar in all respects and enable two or three trial rows to be produced simultaneously, i. e., with the same source of light.

Photometers based on other principles may also be adapted for the purpose set forth herein.

In practice it is not necessary in every case to make all of the fifteen trial pictures mentioned. It will generally suffice to copy a short strip of film with six to eight pictures. The number denoting each volume of light may be copied along with the pictures.

In a modified process the different individual pictures that are subjected to different volumes of light may be copied one after the other, instead of simultaneously, and this enables the trial pictures to be produced in the actual copying apparatus by which the positive films are finally produced.

It will be obvious that many changes or modifications may be made without departing from the scope and spirit of the invention.

I claim—

1. A process for producing trial pictures for ascertaining the correct time of exposures for copying a row of pictures on a film band consisting in exposing an unexposed positive film through a negative band film bearing a plurality of pictures side by side to different quantities of light for the different pictures for an interval of time.

2. A process for producing trial prints for determining the exposure to be given negative films, which comprises, exposing through a negative film having a plurality of pictures, a contacting sensitized film to be printed, to simultaneous illumination from the same source but differing in quantity for each picture.

3. Apparatus for producing trial pictures for ascertaining the correct time of exposures for copying a row of pictures on a film band, comprising a holding device for securing a negative film, a holding device for securing the positive film in contact with said negative film, a source of light for illuminating said films, a tube photometer between said scource of light and film holding means and a time switch whereby the light may be switched on and then automatically switched off after the expiration of a predetermined time.

4. An apparatus for producing trial pictures for ascertaining the correct time of exposures for copying a row of pictures on a film band, comprising a box, an elongated filament lamp in said box, a time switch for said lamp, a negative film holding means, means for holding a positive film in printing contact with the said negative film, separate light channels for directing the beams of the said lamp to different areas of the negative film, and a diaphragm with slots of different sizes interposed between the said lamp and the films.

5. An apparatus for producing trial pictures for ascertaining the correct time of exposures for copying a row of pictures on a film band, comprising a box, separate light channels in said box, an opaque plate having a transparent area for each of the light channels, means to hold a sensitized film in printing contact with a negative film whose pictures separately register with said areas, a diaphragm having a different sized slot for each of the said light channels, an electric metallic-filament lamp for throwing light through the said slots, plates, and negative film; and a time switch whereby the light may be switched on, and then automatically switched off after the expiration of a predetermined time.

In testimony whereof I have signed this specification in the presence of two witnesses.

ARTHUR SCHULZE.

Witnesses:
ADOLF GROSKE,
L. REICH.